United States Patent
Labonte

(10) Patent No.: US 11,539,628 B2
(45) Date of Patent: Dec. 27, 2022

(54) AUTOMATED CONFIGURATION OF POLICER PARAMETERS

(71) Applicant: Arista Networks, Inc., Santa Clara, CA (US)

(72) Inventor: Francois Labonte, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 210 days.

(21) Appl. No.: 16/909,633

(22) Filed: Jun. 23, 2020

(65) Prior Publication Data
US 2021/0399988 A1   Dec. 23, 2021

(51) Int. Cl.
*H04L 47/20* (2022.01)
*H04L 47/25* (2022.01)

(52) U.S. Cl.
CPC ............ *H04L 47/20* (2013.01); *H04L 47/25* (2013.01)

(58) Field of Classification Search
CPC .................................. H04L 47/20; H04L 47/25
See application file for complete search history.

(56) References Cited

U.S. PATENT DOCUMENTS

| | | | |
|---|---|---|---|
| 8,958,318 B1* | 2/2015 | Hastwell | H04L 63/1408 370/252 |
| 9,100,214 B1* | 8/2015 | Joseph | H04L 12/4641 |
| 9,131,408 B1* | 9/2015 | Falsafi | H04M 15/86 |
| 10,050,937 B1* | 8/2018 | Gandhewar | H04L 63/0236 |
| 10,257,098 B1* | 4/2019 | Banse | H04L 47/125 |
| 2005/0027837 A1* | 2/2005 | Roese | H04L 41/0893 719/318 |
| 2007/0127491 A1* | 6/2007 | Verzijp | H04L 47/2441 370/395.2 |
| 2012/0195200 A1* | 8/2012 | Regan | H04L 47/60 370/235.1 |
| 2018/0234297 A1* | 8/2018 | Wang | H04L 47/20 |
| 2019/0065425 A1* | 2/2019 | Noguchi | G06F 13/4027 |

* cited by examiner

*Primary Examiner* — Jung H Park
*Assistant Examiner* — Sumitra Ganguly
(74) *Attorney, Agent, or Firm* — Fountainhead Law Group P.C.

(57) ABSTRACT

Embodiments of the present disclosure automatically set a maximum burst size in a policer to optimize the flow of traffic in a network. In one embodiment, a method includes receiving a policer rate set by a first policy, a maximum rate corresponding to one or more communications channels, and maximum burst time for performing at data burst. A maximum burst size is determined automatically based on the received policer rate, maximum rate, and maximum burst time. A policer in a network device is configured to limit traffic received at the one or more communications channels based on the maximum burst size.

20 Claims, 12 Drawing Sheets

| Key (port/traffic type) | Policer Rate | Max Data Rate | Max Burst Time | Max Burst Size |
|---|---|---|---|---|
| Et1 MC | PR1 | MR1=LS1 | MBT2 | MBS1'=f(PR1, MR1, MBT2) |
| Et1 KMC | PR2 | MR1=LS1 | MBT2 | MBS2'=f(PR3, MR1, MBT2) |
| Et1 BC | PR3 | MR1=LS1 | MBT2 | MBS3'=f(PR3, MR1, MBT2) |
| Et2 MC | PR1 | MR2=LS2 | MBT2 | MBS4'=f(PR1, MR1, MBT2) |
| ... | ... | ... | ... | ... |
| Et4 BC | PRn | MR4=LR4 | MBT2 | MBSn'=f(PRn, MR4, MBT2) |

AUTOMATED CONFIGURATION OF POLICER PARAMETERS

BACKGROUND

The present disclosure relates to computer networking, and more particularly, to network traffic policers.

Packet storms may occur when broadcast packets, multicast packets, or unknown unicast packets, or others, flood a network and thereby degrade network performance. Policers residing at network devices may be used to monitor network traffic and reduce the effects of packet storms. For example, policers may implement a policer rate that limits the rate of incoming network traffic, for example, by dropping traffic that exceeds certain limits defined in the policer. In some circumstances, traditional policers may not be configured for optimal performance. The following disclosure provides advantageous techniques for configuring policer parameters.

BRIEF DESCRIPTION OF THE DRAWINGS

With respect to the discussion to following and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
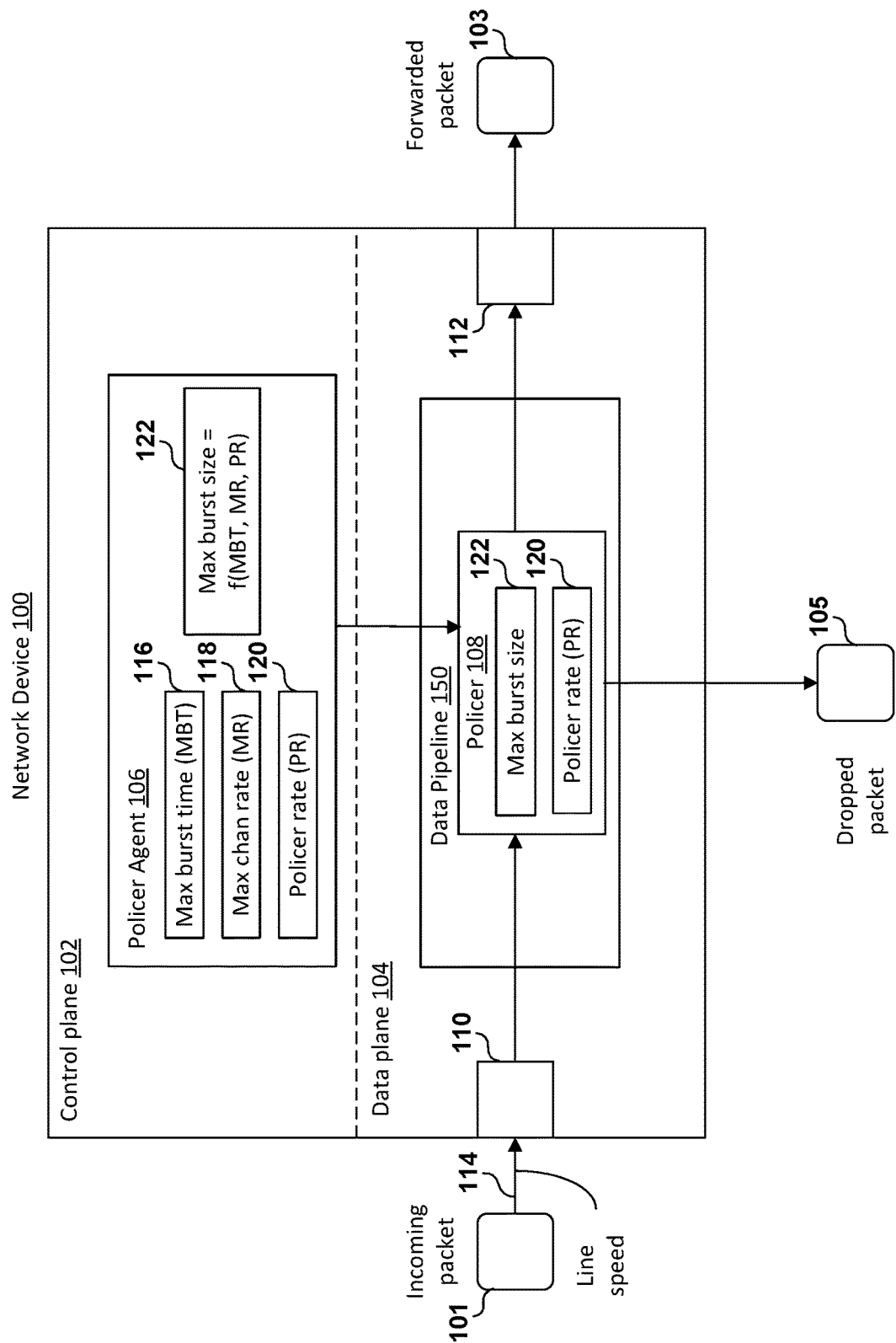
FIG. 1 illustrates an example network device including a policer configuration mechanism according to various embodiments.

FIG. 1 illustrates an example network device 100 including a policer according to various embodiments. Network device 100 includes control plane 102 comprising a policer agent 106 and data plane 104 comprising a policer 108. As is known in the art, control plane 102 configures, manages, and monitors the operation of data plane 104. Data plane 104 receives, processes, and forwards network data using various configuration data (e.g., forwarding, security, quality of service (QoS), and other network traffic processing information) received from the control plane 102. Generally, policing refers to monitoring network traffic and enforcing traffic policies, for example, to control the flow of traffic through a network. Accordingly, in this example, policer 108 may implement logic that limits the traffic flow rate in data plane 104. Policer 108 may be configured to limit network traffic based on a variety of configuration parameters, such as a policer rate and maximum burst size, for example. In some applications, the policer rate may be defined in terms of an absolute rate in bits or bytes per unit time (e.g., 10 Mbps) or in terms of packets (e.g., 1 kpps). In other applications, the policer rate may be defined in terms of a percentage of the speed of a communication channel 114 (aka, a line speed) coupled to an ingress port 110 (e.g., 1% of 100 Gbps). Policer 108 may accommodate limited bursts of traffic by allowing traffic to flow above the policer rate based on a configured maximum burst size. For example, policer 108 may forward packets of a burst for a period of time until the total size of the forwarded packets exceeds the maximum burst size. If the burst size is smaller than the maximum burst size, then the entire burst may be forwarded. If, on the other hand, the burst size is larger than the maximum burst size, the policer may begin dropping portions of the burst exceeding the maximum burst size (e.g., later arriving packets in the burst).

Maximum burst size is traditionally configured by the manufacturer at some arbitrary value. Users may wish to customize the maximum burst size, but it may be difficult for users to determine an optimum value for a particular network application. As a result, user configured values for maximum burst size may result in suboptimal network performance. Moreover, traditional policers do not typically adapt to changes to the state of the network device. Features and advantages of the present disclosure include a maximum burst size that is set dynamically to optimize traffic flow in a network device.

In this example, network device 100 includes control plane 102 comprising a policer agent 106 that configures a policer 108 in a data plane 104. Features and advantages of the present disclosure include a policer agent 106 that automatically determines an optimum maximum burst size 122. Policer agent 106 may be responsible for configuring policer 108 and a plurality of additional policers with respective maximum burst sizes such as a maximum burst size 122. For instance, policer agent 106 may receive a policer rate 120 (PR), which may be set by a network policy (aka a contract), for example. Policer agent 106 may further receive a maximum data rate 118 (MR) corresponding to one or more communications channels, such as communication channel 114. For example, communication channels may be Ethernet channels that may have a variety of different maximum data rates depending on the network environment (e.g., 10 Gbps, 100 Gbps, etc . . . ). Since maximum data rate may be based on data rates for one or more particular channels, the maximum data rate is sometimes referred to herein as the maximum channel rate. Additionally, policer agent 106 may receive a specification of a maximum burst time 116 (MBT) for performing a data burst. Advantageously, policer agent 106 may automatically determine a maximum burst size 122 based on the policer rate 120, the maximum data rate 118, and the maximum burst time 116.

Policer agent 106 may then configure policer 108 with the maximum burst size 122 and policer rate 120 as shown to control the flow of network traffic between ingress port 110 and egress port 112. For example, a policer 108 in a data pipeline 150 of data plane 104 may be configured with a policer rate 120 to set a baseline flow of traffic and a maximum burst size 122 to handle bursts of traffic. In this example, maximum burst size 122 may refer to a threshold under which a given burst is permitted to be forwarded by policer 108 and above which it is not. More particularly, a burst of traffic having a size (e.g., in packets) that is less than the maximum burst size may be forwarded (e.g., if enough time has elapsed since a prior arriving burst). However, when a burst of traffic has a size that is greater than the maximum burst size, a portion of the burst that is under the maximum burst size may be forwarded while the portion of the burst that is over the maximum burst size may be dropped. Typically, the earlier arriving portion of that burst is forwarded while the later arriving portion of the burst is dropped.

In some example systems, policer 108 may implement maximum burst size 122 using a "token bucket" model. In this model, each unit of traffic is represented as a token. Accordingly, tokens may correspond to bits, bytes, or packets, for example. The token bucket has a maximum token value corresponding to the maximum burst size. For each unit of traffic that is forwarded, a token is decremented from the token value of the bucket. For example, if token corresponds to bytes, and if a packet with 200 kBytes is received by a policer, then the number of tokens associated with the policer may be reduced by 200 k when the packet is forwarded. If the policer's token bucket has fewer than 200 k tokens, some of the bytes of data may be dropped, for example. Moreover, according to this model, the token bucket is replenished with tokens at a rate equal to a policer rate. The token bucket accommodates for bursts by allowing a burst of up to the maximum burst size to be forwarded. Yet, because the token bucket is replenished at a finite rate, the token bucket may drop a subsequent burst if insufficient time has elapsed for the token bucket to be replenished. In some example systems, the token bucket may be implemented in a data structure residing in memory of data plane 104, for example.

Figure 2:
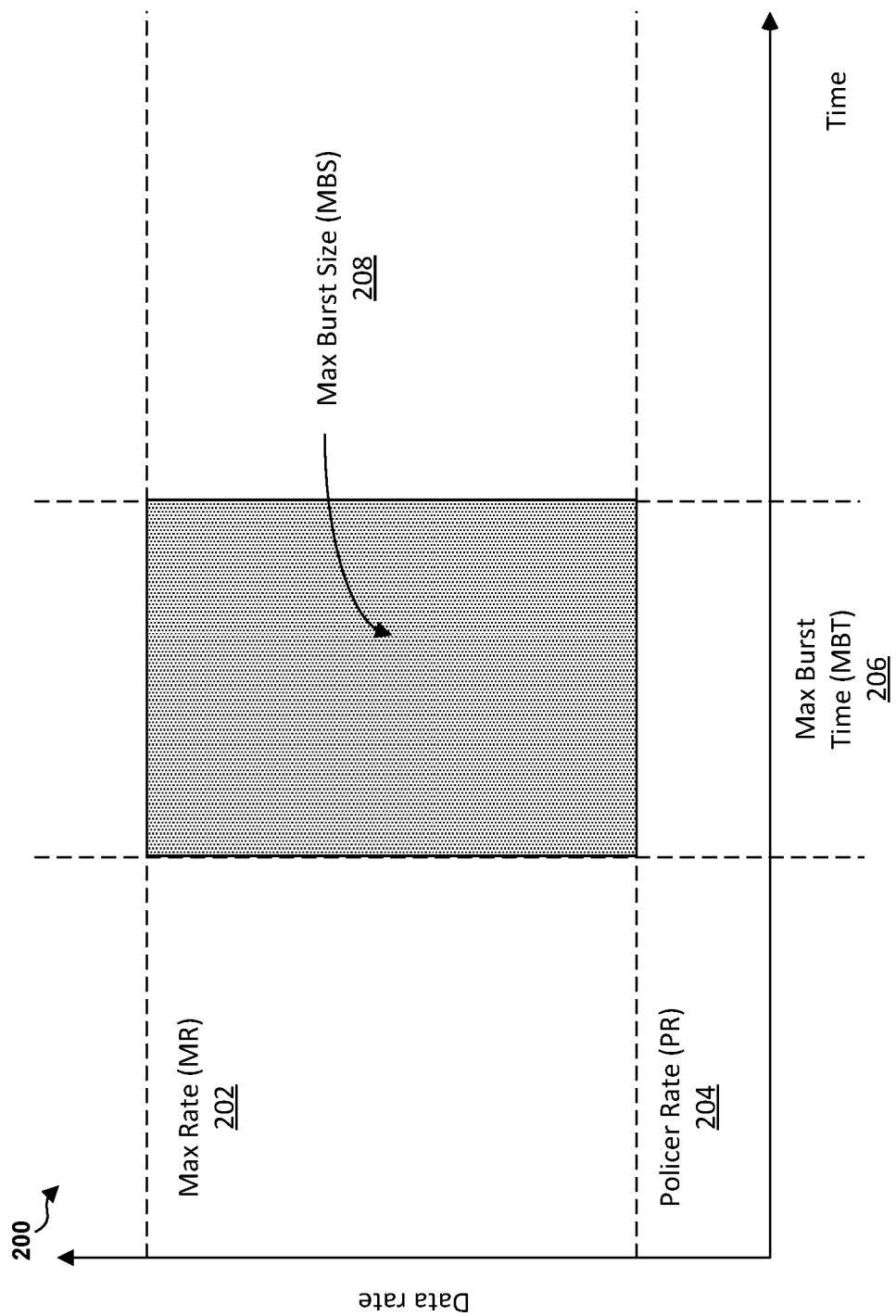
FIG. 2 shows a graph representing how maximum burst size relates to maximum rate, policer rate and maximum burst time according to some embodiments.

FIG. 2 shows a graph 200 representing how maximum burst size 208 relates to maximum rate 202, policer rate 204, and maximum burst time 206, according to some embodiments. As shown, the X-axis represents time and the Y-axis represents a data rate (e.g., rate of incoming or outgoing network traffic). In these and other embodiments, maximum rate (MR) 202 may represent the maximum bandwidth of one or more interfaces being policed (e.g., an Ethernet communication channel). The maximum rate 202 may reflect the port speed or line speed of a single ingress or egress port, for example. For a QoS policer, the maximum rate 202 may reflect the aggregate speed of the ports monitored by the QoS policer. In the embodiment shown, policer rate 204 is less than the maximum rate 202 by some factor (e.g., 1%). Maximum burst time 206 is specified in units of time. In the embodiment shown, maximum burst time 206 may be expressed as the maximum time for which a burst having a data rate exceeding the policer rate 204 is allowed to be forwarded at the maximum rate 202. In the example shown, the maximum burst size 208 is represented graphically by the area bounded by the maximum rate 202, policer rate 204, and maximum burst time 206. From FIG. 2 it can be seen that a policer agent may calculate a maximum burst size (MBS) as follows:

$$MBS=MBT(MR-PR) \quad (eq. 1)$$

Where MBT is maximum burst time multiplied by a difference between a maximum rate of the channel and the policer rate, for example. Equation 1 above, implemented in computer executable software code, may be one example means for determining a maximum burst size based on the policer rate, the maximum data rate, and the maximum burst time. After calculating maximum burst size 122, policer agent 106 configures policer 108 with maximum burst size 122 such that policer 108 polices traffic according to maximum burst size 122.

In various embodiments described in more detail below, a policer agent may automatically generate maximum burst sizes for a plurality of different policers. In some embodiments, a policer agent may use a single maximum burst time (MBT) to calculate a plurality of maximum burst sizes for use by a plurality of respective policers. For example, different policers may police different ingress or egress ports with different line speeds (e.g., 10 Gbps versus 100 Gbps) or they police a differing number of ports (e.g., 1 port versus 8 ports). As a result, these policers may see different maximum rates and may have different programmed maximum burst sizes, for example. In other embodiments, different policers may be configured to have different tolerances to traffic bursts. For example, policers configured to police broadcast traffic may be more tolerant to traffic bursts than those configured to police unknown unicast traffic. As a result, for example, a broadcast policer may have a policer rate of 10% of maximum rate, while an unknown unicast policer may have a policer rate of 1% of maximum rate. In various embodiments, a policer agent is capable of automatically adapting, updating, or reconfiguring maximum burst size when any one of the maximum burst time, maximum channel rate, and/or policer rate changes.

Figure 3:
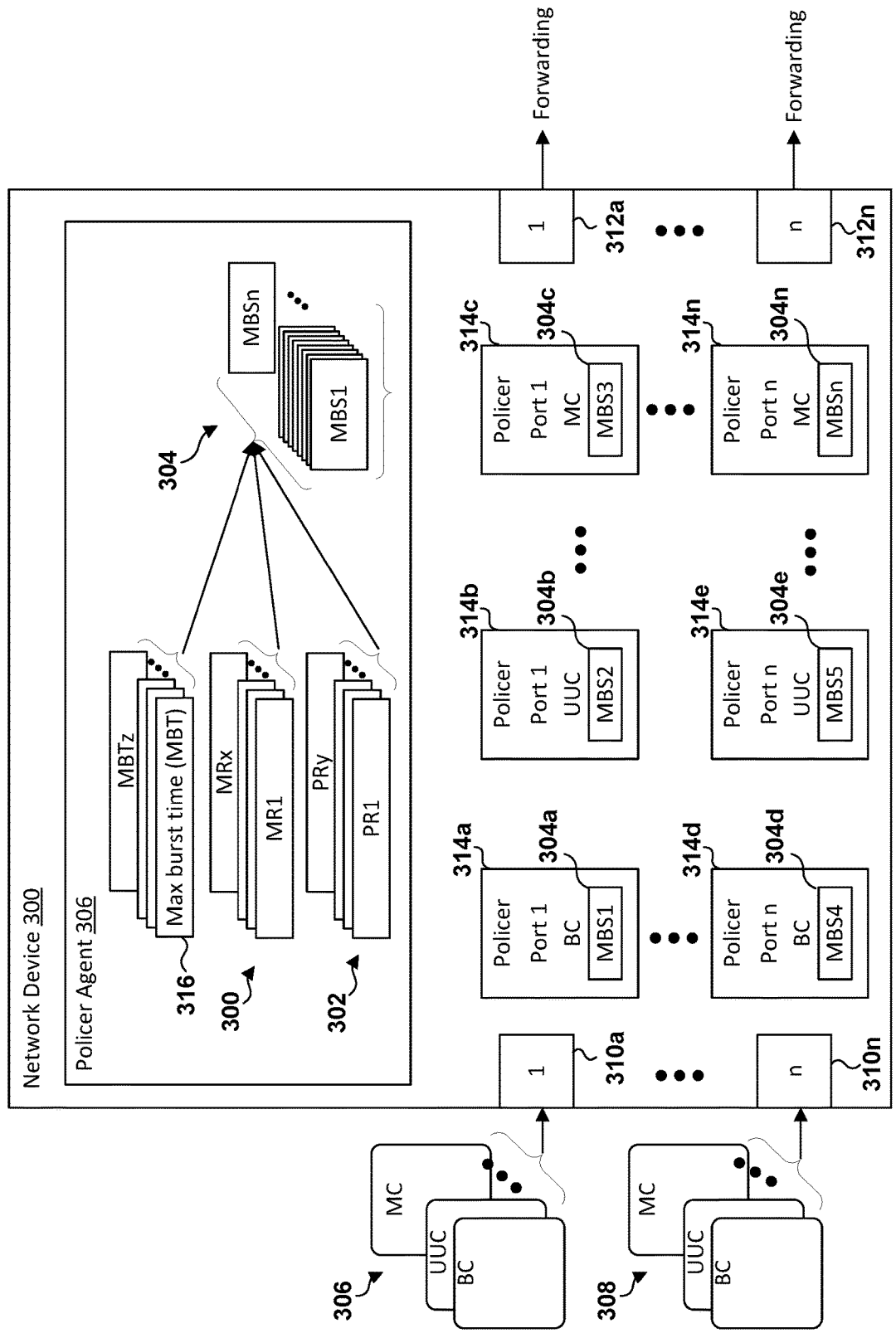
FIG. 3 illustrates an example network device including a policer agent that configures multiple policers according to one embodiment.

FIG. 3 illustrates a conceptual diagram of network device 300 having policer agent 306 that configures multiple policers 314$a$-$n$ with respective maximum burst sizes 304 according to one embodiment. Policer agent 306 may include one or more maximum burst times (MBT) 316, which may be set by a manufacturer or a user, for example. In the embodiment shown, policer agent 306 has also received maximum channel rates (MR) 300 and policer rates (PR) 302 for policers 314$a$-$n$. Maximum channel rates 300 may be associated with the line speeds corresponding to ingress ports 310$a$-$n$, and policer rates (PR) 302 may be associated with policing policies for particular policers 314$a$-$n$ and may depend on traffic types, for example. Each policer 314$a$-$n$ may have an associated maximum burst time, maximum channel rate, and policer rate stored in policer agent 306. Accordingly, policer agent 306 may calculate maximum burst sizes (MBS) 304 as a function of maximum burst time, maximum channel rates, and policer rate specific for each particular policer 314a-n. In various embodiments, the policer agent 106 uses equation 1 (eq. 1) to calculate respective maximum burst sizes 304 for each of policers 314a-n, for example. In this generalized example, there may be a first number "x" of maximum channel rates, a second number "y" of policer rates, and a third number "z" of maximum burst times. In some embodiments, each policer rate, PRi, may be associated with one maximum channel rate, MRi, which is associated with one automatically determined maximum burst time, MBT, for example. However, in other embodiments policer agent 306 may configure a plurality of policers 314a-n, where multiple policer rates (PR) are associated with the same maximum channel rate (MR) or where one maximum burst time (MBT) is used to determine multiple maximum burst sizes (MBS) for multiple policers, for example. Accordingly, in various embodiments, x, y, and, z may, or may not, be the same.

As shown in FIG. 3, policers 314a-n are configured to police incoming network traffic 306 and 308 arriving through ingress ports 310a-n. In various embodiments, ingress ports 310a-n may be part of the same core of a network device or multiple cores of a network device. In the embodiment shown, policers 314a-c are responsible for policing network traffic flowing through ingress port 310a, while policers 314d-n are responsible for policing network traffic flowing through ingress port 310n. Each of policers 314a-314c may be responsible for policing a different type of network traffic. In this example, policer 314a is responsible for policing broadcast (BC) traffic, policer 314b polices unknown unicast (UUC) traffic, and policer 314c polices multicast (MC) traffic.

Consider, for example, policers 314a and 314b, which police broadcast traffic (BC) and unknown unicast traffic (UC), respectively, coming through ingress port 310a. A policing policy may set a policer rate for broadcast traffic at 10% of the maximum channel rate for ingress port 310a and set a policer rate for unknown unicast traffic at 1% of that maximum channel rate. Advantageously, and in this example, policer agent 306 automatically configures policer 314a with a maximum burst size 304a that is greater than a maximum burst size 304b used to configure policer 314b. This technique advantageously allows network device 300 to implement selective tolerance to traffic bursts based on traffic type. In the above example shown in FIG. 3, a single agent 306 is illustrated as determining a plurality of maximum burst sizes and configuring multiple policers. However, it is to be understood that in other embodiments, agent 306 may be multiple agents determining burst sizes and configuring different policers in the data plane, for example.

Figure 4A:
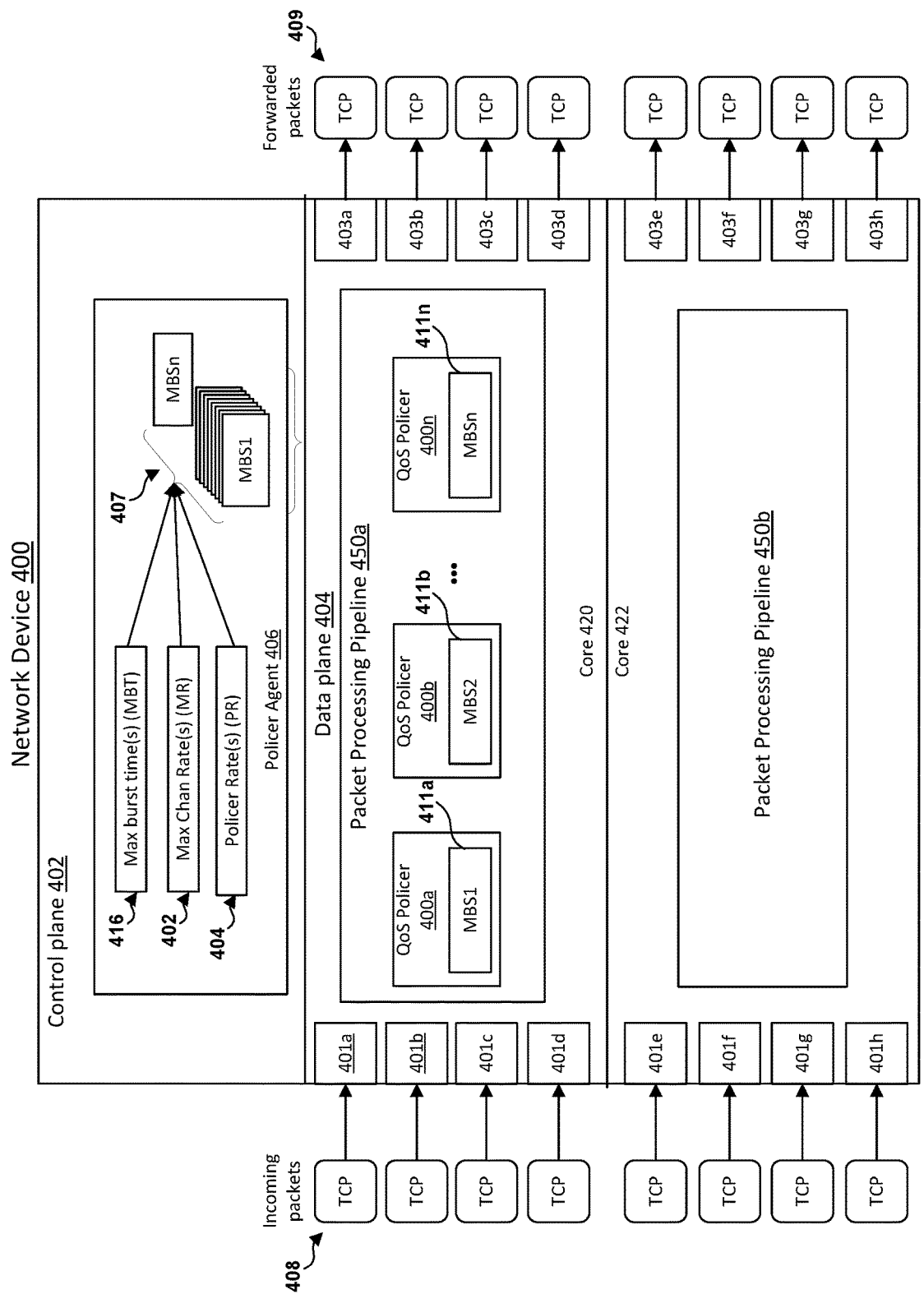
FIG. 4A illustrates another example network device including a policer agent that configures multiple policers according to one embodiment.

FIG. 4A illustrates a network device 400 having a policer agent 406 that configures quality of service (QoS) policers 400a-n with respective maximum burst sizes 407 according to one embodiment. In this example, a data plane 404 of network device 400 includes a first core 420 and a second core 422, which may be integrated circuits for processing network traffic, for example. Both of core 420 and 422 may include packet processing pipeline 450a and 450b that may perform a variety of packet processing functions including policing. In the embodiment shown, QoS policers 400a-n may police packets 408 flowing through packet processing pipeline 450.

Policer agent 406 is shown to include one or more maximum burst times (MTB) 416, one or more maximum channel rates (MR) 402, and one or more policer rates (PR) 404. Maximum channel rates 402 may be associated with the line speeds corresponding to ingress ports 401a-h. QoS policies may specify which of ingress ports 401a-h are included in the policy and policed together, for example. As a result, maximum channel rates 402 may reflect an aggregate value of the line speeds of the specific ingress ports 401a-h included within a given policy. For example, if a QoS policy applies to all of ingress ports 400a-h, and each of ingress ports 400a-h has a line speed of 100 Gbps, then the maximum channel rate associated with that QoS policy would be 800 Gbps. In some embodiments, policer rates 404 may be specified in QoS policies and expressed as a percentage of maximum channel rates 402 or expressed an absolute rate. QoS policers 400a-n may police traffic based on source address or destination address of incoming traffic, for example.

As shown in FIG. 4A, policer agent 406 calculates maximum burst sizes 407 as a function of maximum burst time 416, maximum channel rates 402, and policer rates 404. For example, for each of QoS policers 400a-n, policer agent 406 may calculate a maximum burst size as a function of a maximum burst time, a maximum channel rate, and a policer rate associated with each particular policer (e.g., as described above in equation (1)). In the embodiment shown, policer agent 406 configures each of QoS policers 400a-n with respective maximum burst sizes 411a-n. In this manner, each of policers 400a-n is provisioned with a maximum burst size specific to its policer rate and maximum channel rate.

Figure 4B:
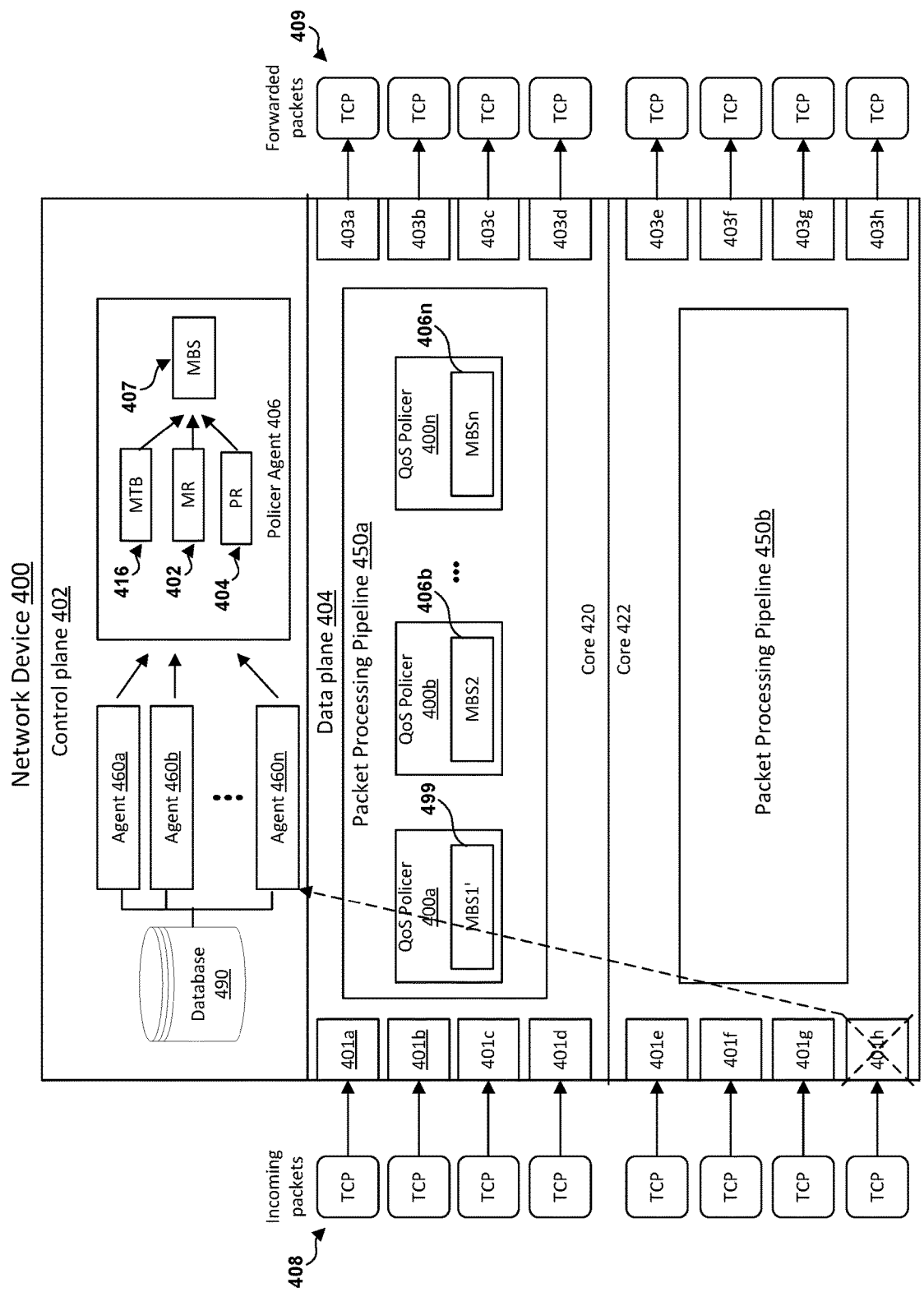
FIG. 4B illustrates an example of automatic updating of maximum burst size in response to a changing network conditions according to one embodiment.

FIG. 4B illustrates policer agent 106 automatically updating maximum burst sizes in response to a changing network conditions according to one embodiment. In this example, an ingress port 401h is rendered non-operational or otherwise removed from a particular QoS policy. In response, policer agent 406 is notified of the operational state of ingress port 401h and responsively updates particular maximum burst sizes 411a-n that are affected. For example, if QoS policer 400a is configured to police traffic arriving through all of ingress ports 401a-h and if each of ingress ports 401a-h have line speeds of 100 Gbps, then an associated maximum channel rate when all ingress ports 401a-h are operational is 800 Gbps. When ingress port 301h is rendered non-operational, the associated maximum channel rate drops to 700 Gbps. Yet, if the maximum burst size provisioned to QoS policer 400a does not change, it may still be policing as though the maximum rate is 800 Gbps, which could lead to breach of the QoS policy. Here, advantageously, maximum burst sizes 411a-n are not only customized to each of policers 400a-n, but also made dynamically responsive to changes in state of network device 400, for example.

In the embodiment shown, network device 400 may include a plurality of software agents 460a-n, for example, in addition to policer agent 406. The software agents 460a-n may perform operations including, but not limited to Spanning Tree Protocol (STP), Open Shortest Path First (OSPF)/Border Gateway Protocol (BGP), Virtual eXtensible LAN (VxLAN), and Multi-Chassis Link Aggregation (MLAG), among others. In the embodiment shown, the operational state (e.g., up or down, operational or non-operational) of ingress ports 401a-h may be monitored by agent 460n. In this example, agents 460a-n may communicate with system database 490 to record configuration and operational state. Accordingly, agents in the system may send and receive configuration and status information with the system database 400. Thus, when ingress port 401h becomes non-operational, agent 403 may record such a state change to system database 400, for example. Next, system database 400 may notify policer agent 406 of that state change (e.g., policer agent 406 may subscribed to notifications of changes by agent 403). In response to receiving the notification, policer agent 406 may update the maximum channel rates 402 used to determine the maximum burst size. In this example, policer agent 406 recalculates one or more of maximum burst sizes 407 whose associated maximum channel rates 402 have been updated. Here, a new maximum burst size 499 (MBS1') is automatically determined for QoS policer 400a, and policer 400a is updated with the new maximum burst sizes 499 automatically.

Figure 5:
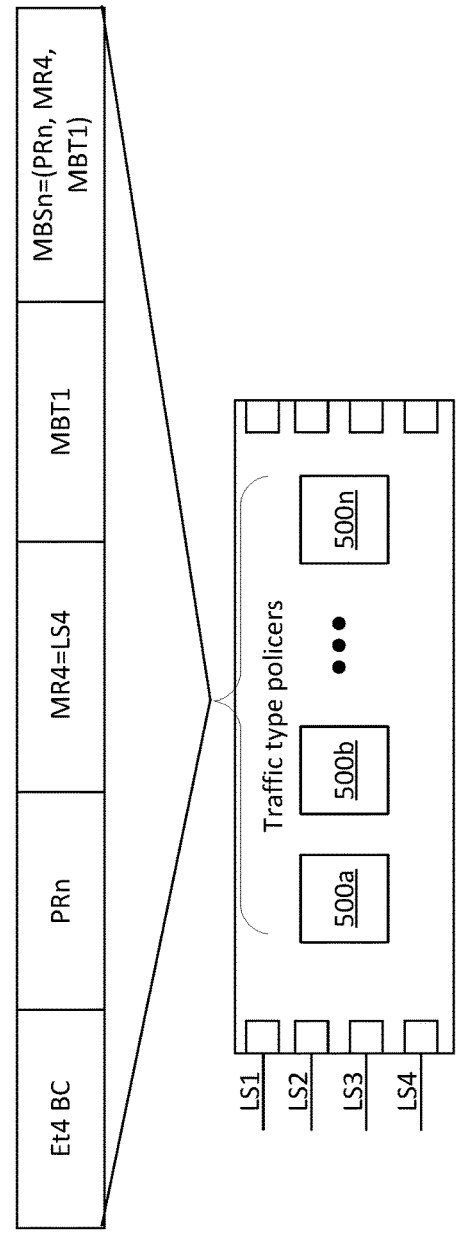
FIG. 5 illustrates an example data structure for configuring a plurality of traffic type policers according to one embodiment.

FIG. 5 illustrates a data structure for configuring a plurality of traffic type policers 500a-n of a network device 500 according to one embodiment. Data structure 501 may be stored in memory or in a database (e.g., database 490 in FIG. 4B) in the control plane of a network device, for example. In this example, data in each row in data structure 501a may configure a corresponding policer 500a-n. For example, the row with the entry of "Et1 MC" corresponds to one of policers 500a-n configured to police multicast traffic (MC) on a first ethernet port (Et1). In that row, for example, the policer rate is PR1, the maximum channel rate is MR1, and the maximum burst time is MBT1. The maximum burst size for Et1 MC is shown to be a function of policer rate PR1, maximum channel rate MR1, and maximum burst time MBT1. The second row with entry "Et1 KMC" corresponds to another one of policers 500a-n configured to police "known multicast traffic" (KMT) on Et1, for example. For Et1 KMC, the maximum channel rate and the maximum burst time may be the same as those of Et1 MC. But, because the policer rate PR2 may be different from PR1, the automatically generated maximum burst size for Et1 KMC may be greater than that of Et1 MC, for example.

Figure 6:
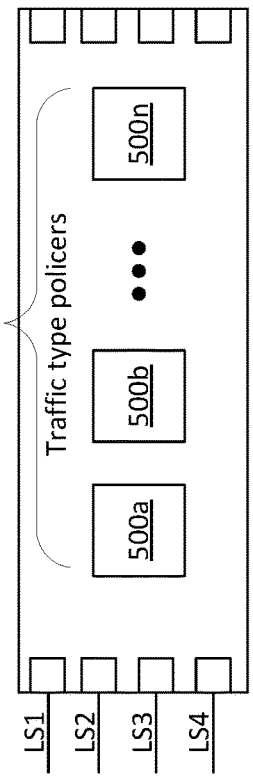
FIG. 6 illustrates another example of automatically updating maximum burst time according to various embodiments.

FIG. 6 illustrates automatically updating maximum burst time according to various embodiments. In the embodiment shown, new maximum burst time data in may be received by network device 500 (e.g., from a user or in a configuration message or file). In response, the maximum burst times in the data structure 501 are updated from MBT1 to MBT2. Accordingly, the maximum burst size entries in data structure 501 are each updated automatically (e.g., by policer agent 106). As a result, traffic type policers 500a-n are each automatically updated with new maximum burst sizes without requiring user input, for example.

Figure 7:
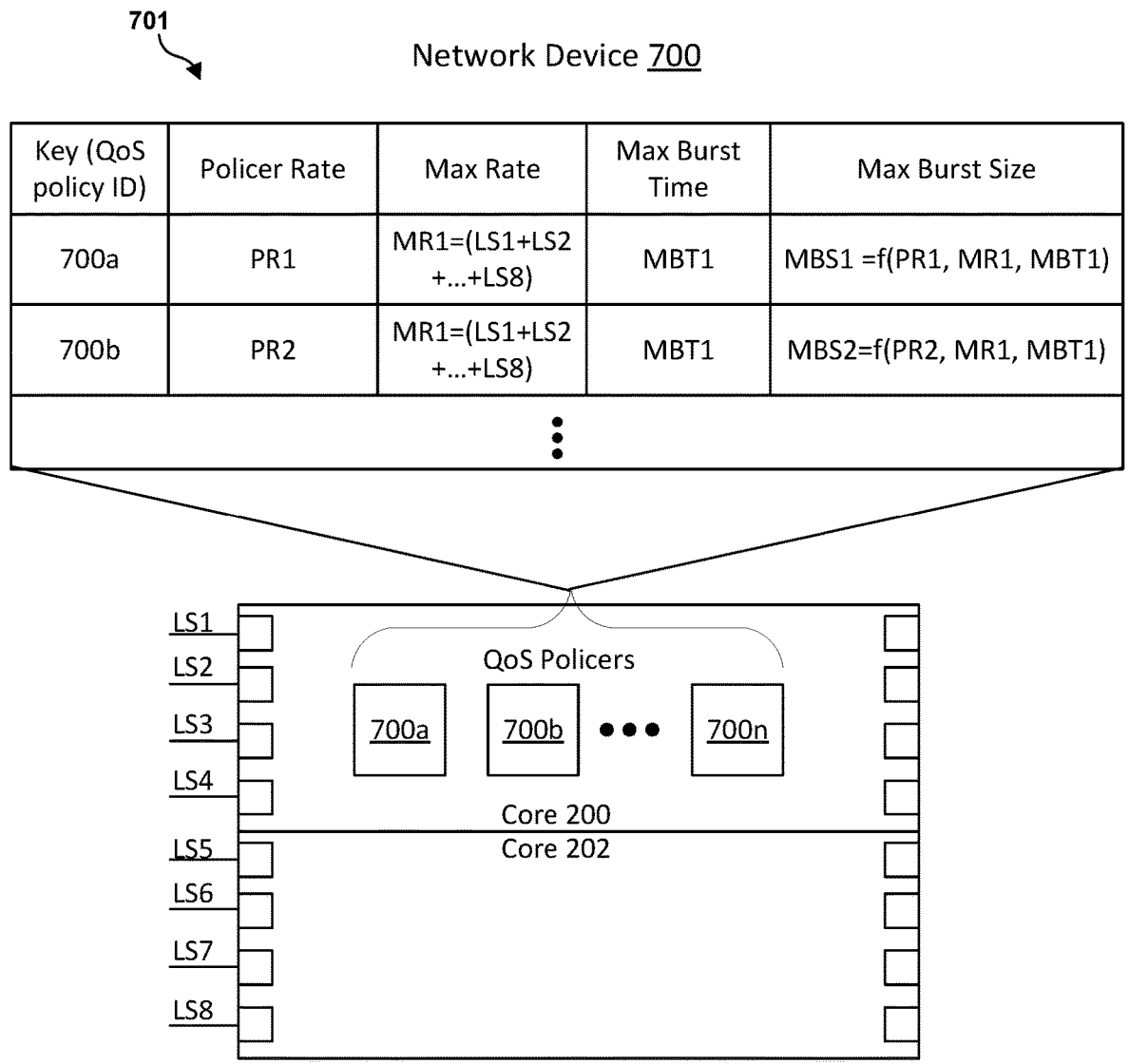
FIG. 7 illustrates another example data structure according to one embodiment.

FIG. 7 illustrates a data structure 701 for configuring a plurality of QoS policers 700a-n of network device 700 according to one embodiment. Similar to data structure 501, each row in data structure 701 corresponds to a specific QoS policer 700a-n. Although not shown, data structure 701 may also include additional QoS policy parameters, such as source address and/or destination address. In the example shown, QoS policer 700a may be associated with policer rate PR1, maximum rate MR1 (which is the sum of line speeds LS1-LS8), and maximum burst time MBT1. Accordingly, QoS policer may have an automatically determined maximum burst size MBS1 that is a function of PR1, MR1, and MBT1.

Figure 8:
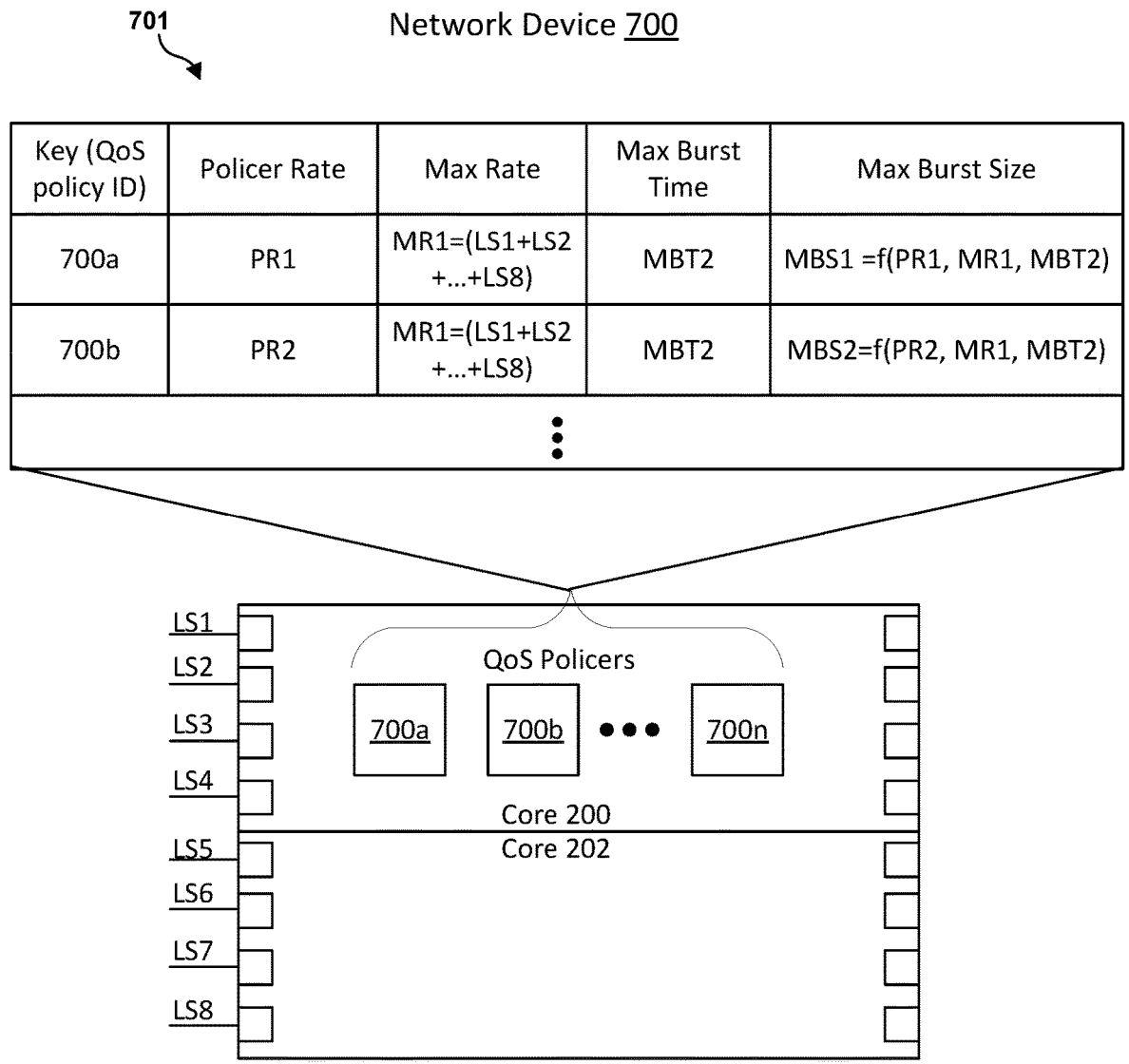
FIG. 8 illustrates QoS policers with updated maximum burst sizes according to one embodiment.

FIG. 8 illustrates QoS policers with updated maximum burst sizes according to one embodiment. In this example, a new maximum burst time may be received from a user, a configuration message, or a file, for example. In response, the maximum burst times in the data structure 701 are updated from MBT1 to MBT2. Furthermore, the maximum burst sizes are each updated (e.g., by policer agent 106). In doing so, policers 700a-n are automatically updated with updated maximum burst sizes without requiring user input. While the above examples illustrate a plurality of policers configured using the same maximum burst time, it is to be understood that different policers may be configured based on different maximum burst times, for example.

Figure 9:
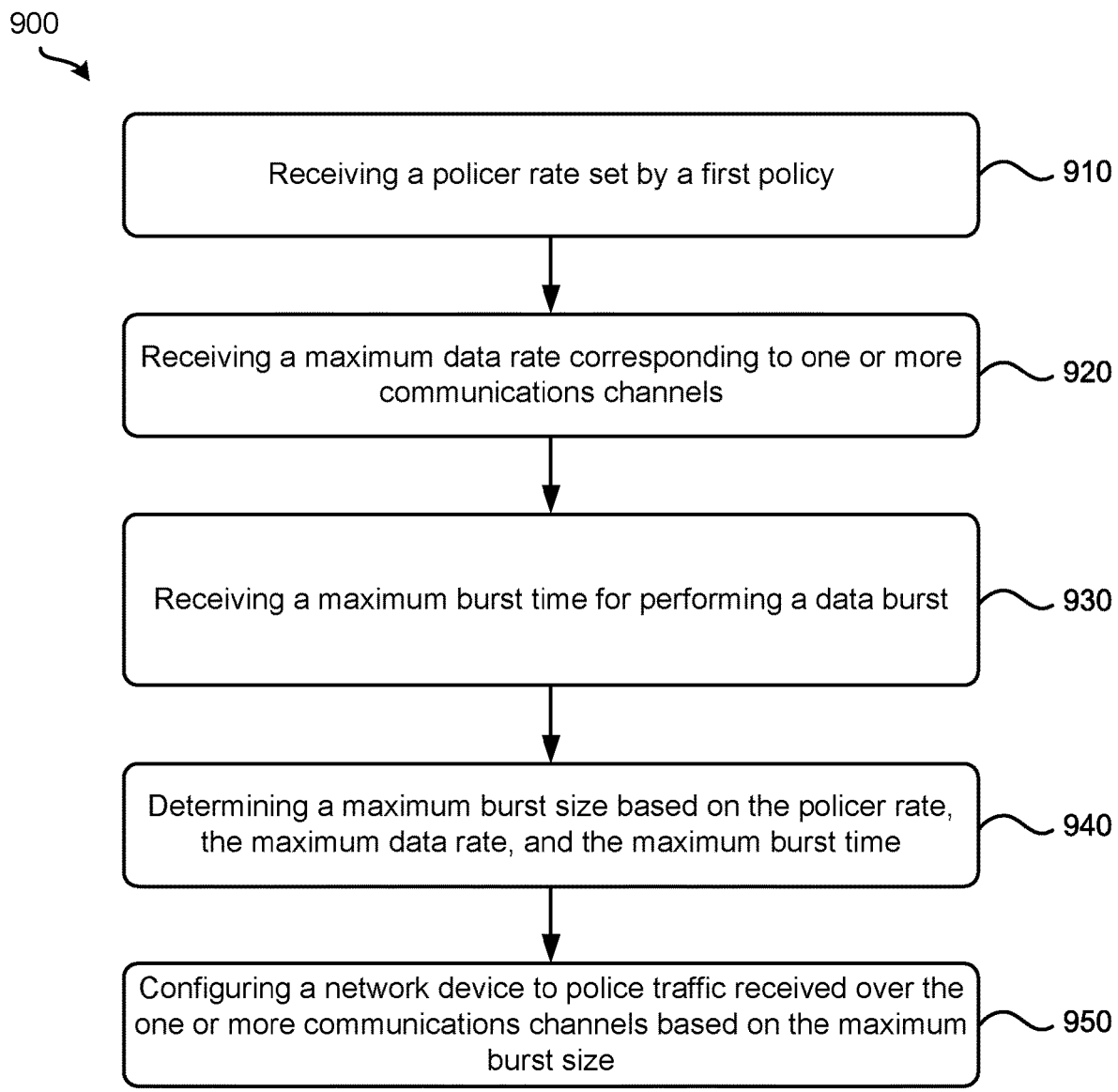
FIG. 9 illustrates an example process for configuring a network device to police network traffic according to an embodiment.

FIG. 9 illustrates an example process 900 for configuring a network device to police network traffic according to an embodiment. Process 900 begins by receiving, at 910, a policer rate set by a first policy. The policer rate may be expressed as a percentage of the maximum rate or it may be expressed as an absolute rate, for example. In various embodiments, the policer rate may differ according to traffic type. If process 900 is implemented with the token bucket model, the replenishment rate of the token bucket may be set to the policer rate, for example. At 920, a maximum data rate corresponding to one or more communications channels is received. In certain embodiments, some policers police traffic arriving through a single ingress interface (e.g., one port), whereas other policers police traffic arriving through a plurality of ingress interfaces (e.g., two or more ports). For example, a traffic type policer may police traffic arriving through a single port, whereas a QoS policer may police traffic arriving through all ingress ports of a switching device or a core of switching device. As a result, the maximum rate associated with a traffic type policer may simply be the line speed of that port it polices. For QoS policers, however, the maximum rate may be the aggregate of the line speeds of the ports it polices. At 930, a maximum burst time for performing a data burst is received. The maximum burst time represents the maximum time for which a burst at maximum rate is permitted, for example. In various embodiments, the policer rate, maximum channel rate, and maximum burst time may be received at various points in a network device. One or more of the policer rate, maximum channel rate, and maximum burst time may be received as any of the following: received in the network device from an external input, received in a policer agent from various memory locations (e.g., database 490 or memory), or received in a software procedure during execution to perform the determination of the maximum burst size (e.g., an equation embodied in software code implementing eq. 1 above). At 940, a maximum burst size is determined based on the received policer rate, maximum data rate, and maximum burst time. At 950, a network device is configured to police traffic at the one or more communications channels according to the maximum burst size. In certain embodiments, process 900 may store the policer rate, maximum data rate, maximum burst time, and calculated maximum burst size in a data structure (e.g., in memory and/or in a local or remote database). Additionally, an agent may configure particular policers in a data plane of the network device with the maximum burst size to police traffic and limit data bursts, for example. In various embodiments, the policers may police network traffic according to the token bucket model where a maximum token value of the token bucket is set to be the maximum burst size. Additionally, process 900 may be performed for each policy and each policer such that each policer is provided with a maximum burst size that is specific to each policer's policer rate and maximum data rate. Moreover, and as noted above, one or more steps of process 900 may be performed when any of policer rates, maximum rates, and/or maximum burst times are updated. In this fashion, process 900 may update the network device with updated maximum burst sizes.

Figure 10:
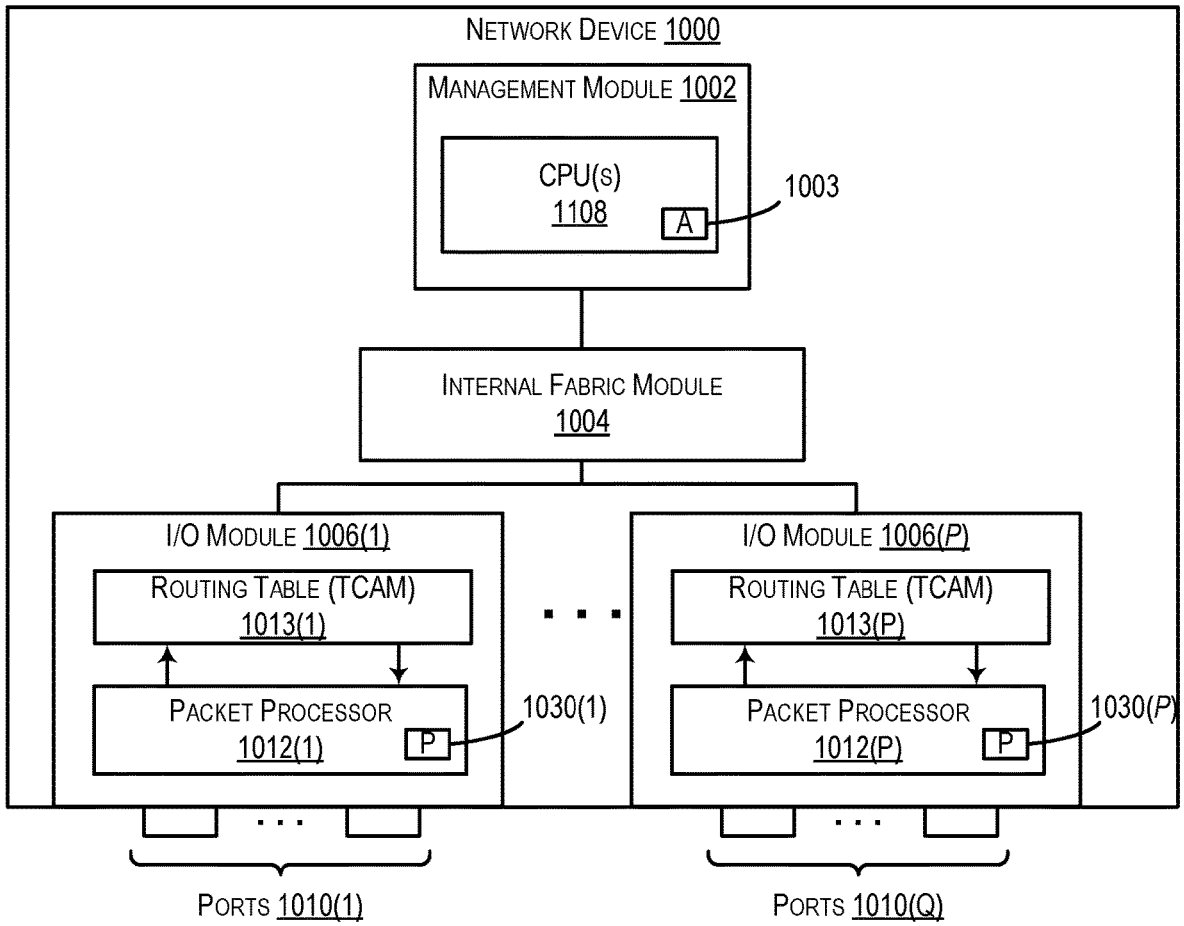
FIG. 10 illustrates one example hardware and software configuration of a network device according to an embodiment.

FIG. 10 depicts an example network device (e.g., a network switch and/or router) 1000 that may be used to implement a network device 100 of FIG. 1 in certain embodiments. Example embodiments of network devices may be implemented, at least in part, via one or more ASICs and/or other hardware processing elements.

As shown, network device 1000 includes a management module 1002, an internal fabric module 1004, and a number of I/O modules 1006(1)-1006(P). Management module 1002 includes one or more management central processing units (CPUs) 1008 for managing/controlling the operation of the device. Each management CPU 1008 can be a general purpose processor, such as an Intel/AMD x86 or ARM-based processor, for example, that operates under the control of software stored in an associated memory (not shown). Management module 1002 may include one or more policer agents 1003 (e.g. software executed by CPU 1008) that determine maximum burst size and configure one or more policers as described above.

Internal fabric module 1004 and I/O modules 1006(1)-1006(P) collectively represent the data, or forwarding, plane of network device 1000. Internal fabric module 1004 is configured to interconnect the various other modules of network device 1000. Each I/O module 1006(1)-1006(P) includes one or more input/output ports 1010(1)-1010(Q) that are used by network device 1000 to send and receive network packets. Each I/O module 1006(1)-1006(P) can also include a packet processor 1012(1)-1012(P). Packet processor 1012(1)-1012(P) is a hardware processing component (e.g., an ASIC) that can make wire speed decisions on how to handle incoming or outgoing network packets. In certain embodiments, one or more of the policers described in the present disclosure may be implemented within packet processors 1012(1)-1012(P). For example, in one embodiment, one or more policers 1030(1)-1030(P) in packet processors 1012(1)-1012(P) may be configured by agent 1003 in management module 1002, for example. In this example, I/O module 1006(1)-1006(P) further includes a routing table 1013(1)-1013(P), which may include a content addressable memory (CAM, such as a TCAM).

It should be appreciated that network device 1000 is illustrative and many other configurations having more or fewer components than network device 1000 are possible.

Figure 11:
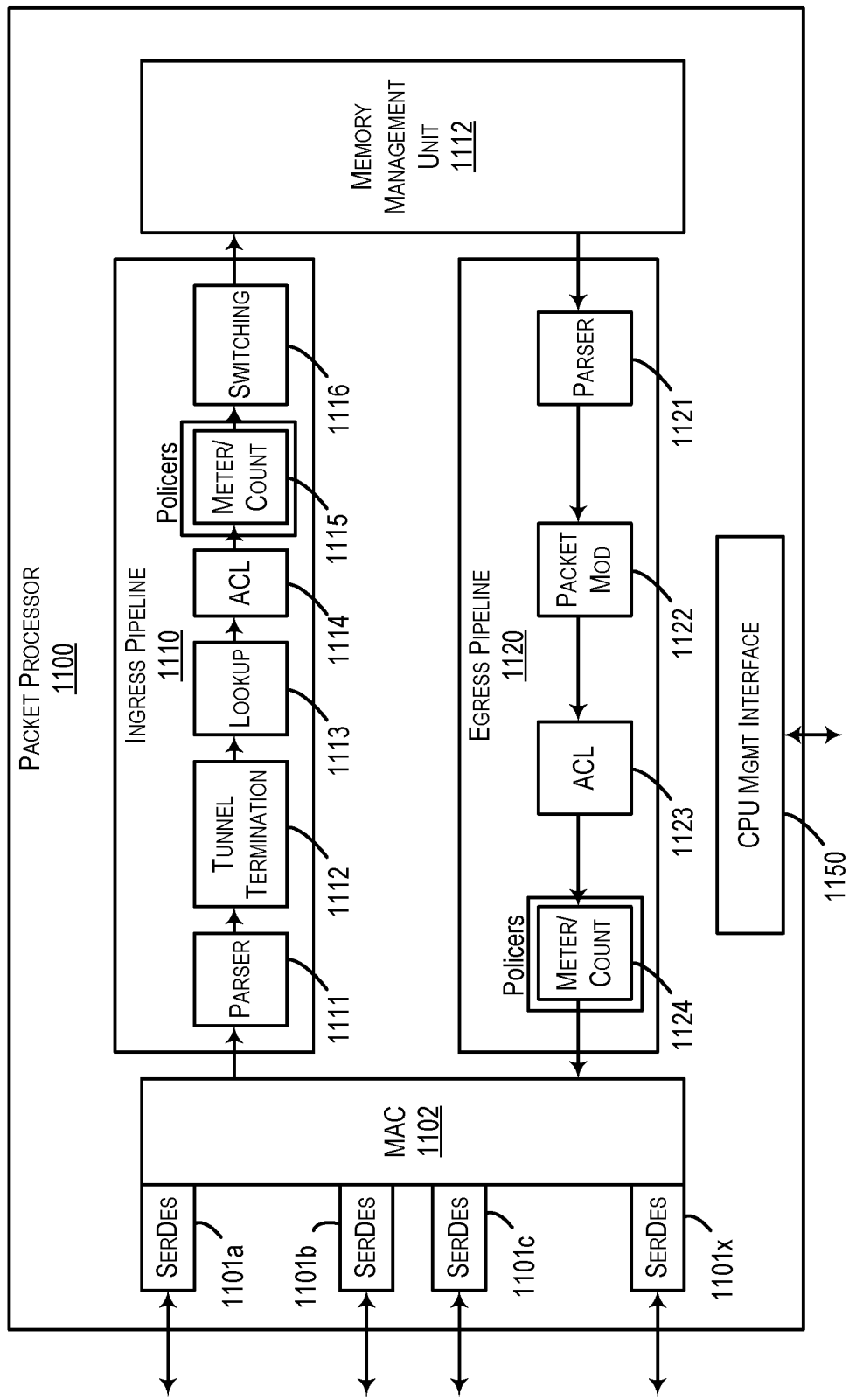
FIG. 11 illustrates an example packet processor according to an embodiment.

FIG. 11 illustrates an example packet processor 1100 according to an embodiment. Network devices according to various embodiments may receive, process, and transmit traffic comprising packets using header information. Such devices may use specialized "forwarding" or "switch" chips, such as packet processor 1100, to process incoming packets fast enough to keep up with modem, high-speed networking protocols. The packet-processing structures inside packet processor 1100 are often called a "pipeline." In various embodiments, packet processor 1100 may be responsible for receiving a packet from an input port, determining where the packet is destined, and sending it out an output port. However, network switches may provide many other functions besides basic forwarding. Packet processor 1100 may include numerous serializer-deserializers ("SerDes") 1101a-x, which receive (or send) data to (or from) a media access controller (MAC) 1102, for example. MAC 1102 is coupled to pipelines containing numerous "stages," with each stage responsible for applying a variety of services to the packet. For example, packet processor 1100 may comprise an "ingress" pipeline 1110 and an "egress" pipeline 1120. Ingress pipeline 1110 may apply services to incoming packets before their next destination has been definitively determined. Egress pipeline 1120 may apply services to packets that are being transmitted to their next destination. Ingress pipeline 1110 and egress pipeline 1120 typically contain numerous stages, and each may provide a variety of services by looking up information using the packet header (or the results of prior lookups). For example, ingress pipeline 1110 may include parser 1111, tunnel termination 1112, lookup (e.g., TCAM/SRAM), an ingress Access Control List 1114 (aka "ACL" or ACL Content Aware Engine, sometimes referred to as, "ICAP"), Metering and Counting 1115, and switching 1116. ACL 1114, along with Metering and Counting 1115 may perform physical port services such as policy-based routing ("PBR"), quality-of-service ("QoS"), and/or Storm Control, for example. Accordingly, Metering and Counting 1115 may include policers described herein, for example. Ingress pipeline 1110 may be coupled to a memory management unit 1112, which may provide flexible queuing and scheduling, for example. Memory management unit 1112 is further coupled to egress pipeline 1120. Egress pipeline 1120 may include parser 1121, packet modification 1122, egress ACL 1123, and Metering and Counting 1124. Metering and Counting 1124 may include policers configured with policer configurations as described above limit traffic, for example. The policers in ingress pipeline Metering and Counting 1115 and egress pipeline Metering and Counting 1124 may be configured by management software running on a CPU and received in packet processor 1100 over a CPU management interface 1150, for example.

Some embodiments may be implemented in a non-transitory computer-readable storage medium for use by or in connection with the instruction execution system, apparatus, system, or machine. The computer-readable storage medium contains instructions for controlling a computer system to perform the techniques described by various embodiments above. The computer system may include one or more computing devices. The instructions, when executed by one or more computer processors, may be configured to perform that which is described in various embodiments above.

FURTHER EXAMPLES

Embodiments of the present disclosure may include methods, systems, or apparatuses, including network devices, that automatically configure policers in a network.

In one embodiment, the present disclosure includes a method of processing data in a network device comprising: receiving a policer rate; receiving a maximum data rate corresponding to one or more communications channels; receiving a maximum burst time for performing a data burst; determining a maximum burst size based on the policer rate, the maximum data rate, and the maximum burst time; and configuring the network device to police traffic received over the one or more communication channels based the maximum burst size.

In another embodiment, the present disclosure includes a network device including one or more network processors, the network processors comprising: a plurality of ingress ports; and a network data processing pipeline comprising a policer, the policer limiting traffic received at one or more of the plurality of ingress ports based a maximum burst size; wherein the maximum burst size is automatically determined based on a policer rate, a maximum data rate associated with at least a portion of the plurality of ingress ports, and a specified maximum burst time for performing a data burst.

In another embodiment, the present disclosure includes a network device, comprising: at least one control plane processor configured in a control plane; at least one network processor to receive and send data traffic; and non-transitory machine-readable medium storing a program executable by the at least one network processor, the program comprising sets of instructions for: receiving a policer rate; receiving a maximum data rate corresponding to one or more communications channels; receiving a maximum burst time for performing a data burst; determining a maximum burst size based on the policer rate, the maximum data rate, and the maximum burst time; and configuring the network device to police traffic received at the one or more communications channels based the maximum burst size.

In another embodiment, the present disclosure includes a network device comprising: a data plane comprising a data processing pipeline configured to receive network traffic on a plurality of ingress ports and send the network traffic on a plurality of egress ports, wherein the data plane comprises a policer to limit the flow of network traffic through the data processing pipeline; and a control plane for at least configuring the data plane (e.g., in addition to possible monitor and control functions), the control plane receiving a policer rate, a maximum data rate corresponding to one or more communication channels, and a maximum burst time, wherein the control plane comprises means for determining a maximum burst size based on the policer rate, the maximum data rate, and the maximum burst time, wherein the control plane configures the policer in the data plane to police traffic received over the one or more communication channels based the maximum burst size.

The above listed embodiments, and others based on the present disclosure, may include at least any one or more of the following embodiments alone or in a variety of combinations.

In one embodiment, determining the maximum burst size comprises calculating a product of the maximum burst time and a difference of the maximum data rate and the policer rate.

In one embodiment, various embodiments further comprising: detecting an updated maximum data rate; automatically, in response to said detecting the updated maximum data rate, determining an updated maximum burst size based on the policer rate, the updated maximum data rate, and the maximum burst time; and automatically reconfiguring the network device to police traffic received over the one or more communication channels based the updated maximum burst size.

In one embodiment, detecting an updated maximum data rate is in response to one or more ingress ports becoming non-operational.

In one embodiment, the policer rate is a first policer rate, the maximum data rate is a first maximum data rate, and the maximum burst time is a first maximum burst size, wherein various embodiments further comprising: receiving a plurality of additional policer rates; determining a plurality of additional maximum burst sizes based on the plurality of additional policer rates, one or more maximum data rates, and one or more maximum burst times; and configuring a plurality of policers in the network device to police traffic based on the plurality of additional maximum burst sizes.

In one embodiment, the one or more maximum burst times comprises the first maximum burst time, and wherein a single maximum burst time is used to determine a plurality of maximum burst sizes.

In one embodiment, the first policer rate and the additional policer rates are associated with a plurality of policers in a data plane of the network device.

In one embodiment, the maximum burst size is determined in a control plane and configured in a policer in a data plane of the network device to police traffic.

In one embodiment, configuring the network device further comprises: setting a maximum value of a token value to the maximum burst size; wherein the token value is incremented at a predefined rate, and wherein the token value is decremented according to units of traffic that are forwarded.

In one embodiment, the predefined rate is the policer rate.

In one embodiment, policing comprises: forwarding incoming traffic when the token value is greater than a number of tokens corresponding to the incoming traffic; and dropping incoming traffic when the token value is less than the number of tokens corresponding to the incoming traffic.

In one embodiment, various embodiments further comprising: receiving a packet at the network device; determining a number of tokens associated with the packet; forwarding the packet if the number of tokens associated with the packet is less than the token value; and dropping the packet if the number of tokens associated with the packet is greater than the token value.

In one embodiment, the policer limits traffic based on a quality of service (QoS).

In one embodiment, the policer limits traffic based on a traffic type. In one embodiment, the traffic type comprises broadcast, known unicast, unknown unicast, or multicast.

In one embodiment, the policer rate, the maximum data rate, and the maximum burst time are received from a data structure, and wherein the determined maximum burst size is stored in the data structure in association with the policer rate, the maximum data rate, and the maximum burst time for a particular policer.

In one embodiment, various embodiments further comprising: forwarding traffic that is below the maximum burst size; and dropping traffic that is above the maximum burst size.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method of processing data in a network device comprising:
receiving a policer rate;
receiving a maximum data rate corresponding to one or more communications channels;
receiving a maximum burst time for forwarding a burst flow of network data;
determining a maximum burst size based on the policer rate, the maximum data rate, and the maximum burst time;
configuring the network device to police traffic received over the one or more communication channels based on the maximum burst size,
wherein the policer rate is a first policer rate, the maximum data rate is a first maximum data rate, and the maximum burst time is a first maximum burst time;
receiving a plurality of additional policer rates;

determining a plurality of additional maximum burst sizes based on the plurality of additional policer rates, one or more maximum data rates, and one or more maximum burst times; and configuring a plurality of policers in the network device to police traffic based on the plurality of additional maximum burst sizes, wherein the one or more maximum burst times comprises the first maximum burst time, and wherein the first maximum burst time is used to determine the plurality of additional maximum burst sizes.

2. The method of claim 1, wherein said determining the maximum burst size comprises calculating a product of the maximum burst time and a difference between the maximum data rate and the policer rate.

3. The method of claim 1, further comprising:
detecting an updated maximum data rate;
automatically, in response to said detecting the updated maximum data rate, determining an updated maximum burst size based on the policer rate, the updated maximum data rate, and the maximum burst time; and
automatically reconfiguring the network device to police traffic received over the one or more communication channels based on the updated maximum burst size.

4. The method of claim 3, wherein said detecting the updated maximum data rate is in response to one or more ingress ports becoming non-operational.

5. The method of claim 1, wherein the first policer rate and the additional policer rates are associated with a plurality of policers in a data plane of the network device.

6. The method of claim 1, wherein the maximum burst size is determined in a control plane and configured in a police, in a data plane of the network device to police traffic.

7. The method of claim 6, wherein the policer limits traffic based on a quality of service (QoS).

8. The method of claim 6, wherein the policer limits traffic based on a traffic type.

9. The method of claim 8, wherein the traffic type comprises broadcast, known unicast, unknown unicast, known multicast, or unknown multicast.

10. The method of claim 1, wherein said configuring the network device further comprises:
setting a maximum value of a token value to the maximum burst size;
wherein the token value is incremented at a predefined rate, and wherein the token value is decremented according to units of traffic that are forwarded.

11. The method of claim 10, wherein said policing comprises:
forwarding incoming traffic when the token value is greater than a number of tokens corresponding to the incoming traffic; and
dropping incoming traffic when the token value is less than the number of tokens corresponding to the incoming traffic.

12. The method of claim 10, further comprising:
receiving a packet at the network device;
determining a number of tokens associated with the packet;
forwarding the packet if the number of tokens associated with the packet is less than the token value; and
dropping the packet if the number of tokens associated with the packet is greater than the token value.

13. The method of claim 10, wherein the predefined rate is the policer rate.

14. The method of claim 1, wherein the policer rate, the maximum data rate, and the maximum burst time are received from one or more data structures, and wherein the determined maximum burst size is stored in the one or more data structures in association with the policer rate, the maximum data rate, and the maximum burst time for a particular policer.

15. The method of claim 1, further comprising:
forwarding traffic that is below the maximum burst size; and
dropping traffic that is above the maximum burst size.

16. A network device including one or more network processors, the one or more network processors comprising:
a plurality of ingress ports; and
a network data processing pipeline comprising a policer, the policer limiting traffic received at one or more of the plurality of ingress ports based on a maximum burst size;
wherein the maximum burst size is automatically determined based on a policer rate, a maximum data rate associated with at least a portion of the plurality of ingress ports, and a specified maximum burst time for forwarding a burst flow of network data,
wherein the policer rate is a first policer rate, the maximum data rate is a first maximum data rate, and the maximum burst time is a first maximum burst time,
the network data processing pipeline configured to:
receive a plurality of additional policer rates;
determine a plurality of additional maximum burst sizes based on the plurality of additional policer rates, one or more maximum data rates, and one or more maximum burst times; and
configure a plurality of policers in the network device to police traffic based on the plurality of additional maximum burst sizes,
wherein the one or more maximum burst times comprises the first maximum burst time, and wherein the first maximum burst time is used to determine the plurality of additional maximum burst sizes.

17. A network device, comprising:
at least one control plane processor;
at least one network processor to receive and send data traffic; and
one or more non-transitory machine-readable media storing a program executable by the at least one network processor, the program comprising sets of instructions for:
receiving a policer rate;
receiving a maximum data rate corresponding to one or more communications channels;
receiving a maximum burst time for forwarding a burst flow of network data;
determining a maximum burst size based on the policer rate, the maximum data rate, and the maximum burst time;
configuring the network device to police traffic received at the one or more communications channels based on the maximum burst size,
wherein the policer rate is a first policer rate, the maximum data rate is a first maximum data rate, and the maximum burst time is a first maximum burst time;
receiving a plurality of additional policer rates;
determining a plurality of additional maximum burst sizes based on the plurality of additional policer rates, one or more maximum data rates, and one or more maximum burst times; and configuring a plurality of policers in the network device to police traffic based on the plurality of additional maximum burst sizes,
wherein the one or more maximum burst times comprises the first maximum burst time, and wherein the first maximum burst time is used to determine the plurality of additional maximum burst sizes.

18. A network device comprising:
a data plane comprising one or more data plane processors and a data processing pipeline configured to receive network traffic on a plurality of ingress ports and send the network traffic on a plurality of egress ports, wherein the data plane comprises a policer to limit a flow of network traffic through the data processing pipeline;
a control plane comprising one or more control plane processors and for at least configuring the data plane, the control plane receiving a policer rate, a maximum data rate corresponding to one or more communication channels, and a maximum burst time, wherein the control plane determines a maximum burst size based on the policer rate, the maximum data rate, and the maximum burst time,
wherein the control plane configures the policer in the data plane to police traffic received over the one or more communication channels based on the maximum burst size, and
wherein the policer rate is a first policer rate, the maximum data rate is a first maximum data rate, and the maximum burst time is a first maximum burst time,
the one or more control plane processors configured to:
receive a plurality of additional policer rates;
determine a plurality of additional maximum burst sizes based on the plurality of additional policer rates, one or more maximum data rates, and one or more maximum burst times; and
configure a plurality of policers in the network device to police traffic based on the plurality of additional maximum burst sizes,
wherein the one or more maximum burst times comprises the first maximum burst time, and wherein the first maximum burst time is used to determine the plurality of additional maximum burst sizes.

19. The network device of claim 18, wherein the one or more control plane processors is further configured to:
detect an updated maximum data rate;
automatically, in response to said detecting the updated maximum data rate, determine an updated maximum burst size based on the policer rate, the updated maximum data rate, and the maximum burst time; and
automatically reconfigure the network device to police traffic received over the one or more communication channels based on the updated maximum burst size.

20. The network device of claim 19, wherein said detecting the updated maximum data rate is in response to one or more ingress ports becoming non-operational.

* * * * *